US010494723B2

(12) United States Patent
Chew

(10) Patent No.: US 10,494,723 B2
(45) Date of Patent: Dec. 3, 2019

(54) SYSTEM AND METHOD FOR PROVIDING CORROSION PROTECTION OF METALLIC STRUCTURE USING TIME VARYING ELECTROMAGNETIC WAVE

(71) Applicant: Sembcorp Marine Repairs & Upgrades Pte. Ltd, Singapore (SG)

(72) Inventor: Hwee Hong Chew, Singapore (SG)

(73) Assignee: Sembcorp Marine Repairs & Upgrades Pte. Ltd., Singapore (SG)

(*) Notice: Subject to any disclaimer, the term of this patent is extended or adjusted under 35 U.S.C. 154(b) by 314 days.

(21) Appl. No.: 14/420,719

(22) PCT Filed: Oct. 11, 2012

(86) PCT No.: PCT/SG2012/000380
§ 371 (c)(1),
(2) Date: Feb. 10, 2015

(87) PCT Pub. No.: WO2014/058388
PCT Pub. Date: Apr. 17, 2014

(65) Prior Publication Data
US 2015/0218712 A1 Aug. 6, 2015

(51) Int. Cl.
*C23F 13/04* (2006.01)
*C25D 11/02* (2006.01)
(Continued)

(52) U.S. Cl.
CPC ............ *C23F 13/04* (2013.01); *C23F 13/005* (2013.01); *C23F 13/06* (2013.01); *C23F 13/08* (2013.01);
(Continued)

(58) Field of Classification Search
CPC ........ C23F 13/04; C23F 13/06; C23F 13/005; C23F 13/08; C23F 2213/21; C23F 2213/31; C25D 11/024; C25D 11/34; F16L 58/00
(Continued)

(56) References Cited

U.S. PATENT DOCUMENTS 2,435,973 A * 2/1948 MacTaggart ............ C23F 13/02
204/196.05
3,022,234 A * 2/1962 Anderson ............... C23F 13/04
204/196.02
(Continued)

FOREIGN PATENT DOCUMENTS

GB 2447028 5/2012
RU 2347012 2/2009
(Continued)

*Primary Examiner* — Nicholas A Smith
*Assistant Examiner* — Colleen M Raphael
(74) *Attorney, Agent, or Firm* — Cesari and McKenna, LLP

(57) ABSTRACT

The present invention provides a system and a method for providing corrosion protection of a metallic structure using time varying electromagnetic wave. The system comprises: a generator for generating electromagnetic wave having a time varying frequency, said generator having at least two output terminals in electrical connection respectively with first and second excitation sites positioned in a spaced manner on the metallic structure, allowing for subjecting the metallic structure to the electromagnetic wave; and an electric power source connected to the generator for applying a driving voltage to the generator to drive the generation of the electromagnetic wave; wherein the driving voltage and/or the frequency of the electromagnetic wave are selected such that the metallic structure is energized to form
(Continued)

in-situ a passive oxidized species of the metal on a surface of the metallic structure, which species is insusceptible to corrosion.

14 Claims, 3 Drawing Sheets

(51) Int. Cl.
*C25D 11/34* (2006.01)
*C23F 13/08* (2006.01)
*C23F 13/00* (2006.01)
*C23F 13/06* (2006.01)
*F16L 58/00* (2006.01)

(52) U.S. Cl.
CPC ............ *C25D 11/024* (2013.01); *C25D 11/34* (2013.01); *C23F 2213/21* (2013.01); *C23F 2213/31* (2013.01); *F16L 58/00* (2013.01)

(58) Field of Classification Search
USPC .................. 205/340, 724–740, 106–107, 320
See application file for complete search history.

(56) References Cited

U.S. PATENT DOCUMENTS

| | | | | |
|---|---|---|---|---|
| 3,163,817 A * | 12/1964 | Simpson | ................ | C23F 13/04 324/239 |
| 3,242,064 A * | 3/1966 | Byrne | ................ | C23F 13/04 204/196.03 |
| 3,556,971 A * | 1/1971 | Husock | ................ | C23F 13/04 204/196.05 |
| 3,692,650 A * | 9/1972 | Kipps et al. | ........... | C23F 13/04 204/196.05 |
| 4,664,764 A * | 5/1987 | Zofan | ................ | C23F 13/04 204/196.03 |
| 4,767,512 A * | 8/1988 | Cowatch | ................ | C23F 13/02 204/196.05 |
| 4,941,775 A * | 7/1990 | Benedict | ................ | C23F 13/02 204/196.17 |
| 5,077,486 A * | 12/1991 | Marson | ................ | C23F 13/04 204/196.03 |
| 5,728,943 A * | 3/1998 | Colter, Jr. | ........... | G01N 17/043 324/700 |
| 5,750,071 A * | 5/1998 | Fiorino | ................ | C23F 13/00 205/724 |
| 5,999,107 A * | 12/1999 | Cooper | ................ | C23F 13/22 205/730 |
| 6,107,811 A * | 8/2000 | Caudill | ................ | C23F 13/04 324/693 |
| 6,173,669 B1 * | 1/2001 | Staerzl | ................ | B63B 59/04 205/740 |
| 6,224,742 B1 * | 5/2001 | Doniguian | ............. | C23F 13/04 204/196.03 |
| 6,224,743 B1 * | 5/2001 | Satyanarayana | ....... | B65D 90/46 205/730 |
| 6,261,439 B1 * | 7/2001 | Schwabe | ................ | C23F 13/04 204/196.01 |
| 6,469,918 B1 * | 10/2002 | Abramski | ............. | C23F 13/04 205/726 |
| 6,547,952 B1 * | 4/2003 | Staerzl | ................ | B63B 59/04 204/196.01 |
| 7,884,626 B2 * | 2/2011 | Peters | ................ | G08C 19/02 205/775.5 |
| 2002/0017466 A1 * | 2/2002 | Petrenko | ................ | B82Y 30/00 205/742 |
| 2002/0050830 A1 * | 5/2002 | Hudson | ................ | C23F 13/22 324/700 |
| 2003/0169058 A1 * | 9/2003 | Pierre | ................ | C23F 13/04 324/700 |
| 2004/0089559 A1 * | 5/2004 | Dowling | ................ | C23F 13/04 205/725 |
| 2004/0211677 A1 * | 10/2004 | Lewis | ................ | C23F 13/04 205/725 |
| 2009/0166219 A1 * | 7/2009 | Richardson | ............. | C23F 13/04 205/729 |
| 2009/0229973 A1 * | 9/2009 | Miller | ................ | C23F 13/04 204/196.06 |
| 2010/0101933 A1 * | 4/2010 | Stefanini | ................ | C23F 13/02 204/157.15 |
| 2012/0152733 A1 * | 6/2012 | Hanlon | ................ | C23F 13/04 204/196.06 |
| 2013/0081955 A1 * | 4/2013 | Al-Mubasher | .......... | C23F 13/16 205/724 |

FOREIGN PATENT DOCUMENTS

WO WO 2006/067418 6/2006
WO WO 2010/112914 10/2010

* cited by examiner

SYSTEM AND METHOD FOR PROVIDING CORROSION PROTECTION OF METALLIC STRUCTURE USING TIME VARYING ELECTROMAGNETIC WAVE

CROSS-REFERENCE TO RELATED APPLICATION

This application is the National Stage of International Application No. PCT/SG2012/000380, filed Oct. 11, 2012, the contents of which are incorporated herein by reference in their entirety for all purposes.

FIELD OF THE INVENTION

This invention relates generally to the field of corrosion control of metallic structures, and more particularly, to system and method for providing corrosion protection of metallic structures, particularly immersed and buried metallic structures such as pipelines, water tanks, by application of time varying electromagnetic wave operating in a desired frequency and generated by a desired driving voltage.

BACKGROUND OF THE INVENTION

Corrosion is one of the major problems associated with metallic structures, since all metals are known to exhibit a tendency to be oxidized. Cathodic protection is one way of protecting the metallic structures and preventing corrosion as a standard corrosion protection practice in many industries.

Cathodic protection can, in principle, be applied to any metallic structure in contact with an electrolyte. In practice, its main use is to protect steel structures buried in soil or immersed in water. The structures commonly protected include the exterior surfaces of pipelines, ship's hulls, jetties, foundation piling, steel sheet-piling, and offshore platforms. Cathodic protection is also used on the interior surfaces of water storage tanks and water circulating systems.

In cathodic protection, the metallic structure to be protected acts as the cathode and receives a direct current from the anode which is a consumable, semi-consumable or permanent anode. By cathodic protection, only direct current is entering the cathode surface to suppress the corrosion current from leaving the cathode surface but there is no formation of any protective coating.

The protective current density required for cathodic protection of the steel structure is predominantly determined by its surface condition and also the environment conditions it is exposed to. Bare or badly corroded steel surface requires higher protective current hence higher energy cost, while a well coated steel surface requires much less protective current. However, costs for applying the coating on the steel structure in submerged zone or in the buried zone is high and in general, the coating would not last till the end of the structure service life. Renewal of the coating during the service life of the structure is even more costly. For this reason, many steel structures are left uncoated and relying on the high protective cathodic current for corrosion protection.

Whether the submerged or buried steel structure is coated or bare, whenever there is stray or interference current, the steel structure immersed in the electrolyte would be subjected to the interference corrosion as the steel in contact with the electrolyte may be dissolved into Fe ions when DC current leaves the steel surface according to the following equation,

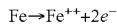

Yet cathodic protection has another limitation. The operating voltage of the cathodic protection anode is dependent on the electrolyte conductivity. When the steel structure is exposed to a low conductivity electrolyte such as river water or estuary water, a high driving voltage is required to drive out the protective current from the anode as the low conductivity water increases the resistance from the anode to the electrolyte (i.e. water). This results in high energy consumption of the cathodic protection system and difficulty in designing a suitable cathodic protection scheme.

In general, cathodic protection is a passive method of protection, it is unable to produce its own protective coating but relying on the externally applied protective coating to reduce its required protection current and yet it is still vulnerable to interference corrosion current and also requires a high voltage to operate under the low conductivity condition.

The cathodic protection method has been extensively used to protect the metallic structure by providing an anode which has a different potential compared to the metallic structure and corrodes preferentially. Two types of anode are available: sacrificial and impressed-current type. In addition to the drawbacks and shortcomings as mentioned above, the sacrificial anode and the impressed-current system have their respective limitations which have been well-known in the art.

Presently, there are also methods used for closed loop water treatment systems, which methods use the pulsating electromagnetic wave to treat the water for corrosion protection of the steel structures in water, instead of treating the steel structure directly. However, these methods are ineffective and impractical for open loop water systems such as jetty steel piles in the open sea.

Therefore, there exists a need for new apparatus and method that are capable of providing long-lasting protective coating for the surface of a metallic structure by treating the structure directly at low cost, irrespective of whether the metallic structure is buried in soil or immersed in water or whether the metallic structure is in a closed loop system or in an open system, however, allows an efficient control and prevention of corrosion of the structure.

SUMMARY OF THE INVENTION

The present invention has been developed to fulfill the needs noted above and therefore has a principle object of the provision of a system for providing corrosion protection of a metallic structure using time varying electromagnetic wave which provides an extended period of corrosion protection with low maintenance.

Another object of the invention is to provide a system for providing corrosion protection of a metallic structure using time varying electromagnetic wave which is significantly more economical of energy and convenient to utilize.

A further object of the invention is to provide a system for providing corrosion protection of a metallic structure using time varying electromagnetic wave which is robust and allows an efficient control or prevention of corrosion.

These and other objects and advantages of the invention are satisfied by providing a system for providing corrosion protection of a metallic structure using time varying electromagnetic wave, comprising:

a generator for generating electromagnetic wave having a time varying frequency, said generator having at least two output terminals in electrical connection respectively with first and second excitation sites which are positioned in a spaced manner on the metallic structure, allowing for subjecting the metallic structure to the electromagnetic wave; and an electric power source connected to the generator for applying a driving voltage to the generator to drive the generation of the electromagnetic wave;

wherein the driving voltage and/or the frequency of the electromagnetic wave are selected such that the metallic structure is energized to form in-situ a passive oxidized species of the metal on a surface of the metallic structure, which species is insusceptible to corrosion.

The term "metallic structure" used herein includes the elemental metal structure and the metal alloy structure.

Preferably, at least one ultra low frequency emitter is mounted on one or two of the first and second excitation sites to be electrically coupled to the generator for reinforcing the electromagnetic wave.

In some cases, the system of the invention is used in combination with a supplementary cathodic protection system applied to the metallic structure, in order for the shift of the potential of the metallic structure to be more negative until the structure has a full cathodic protection potential in a short period of time. At that stage, the driving force for the corrosion reaction is removed, which is thus called "full cathodic protection". The system of the invention and the supplementary cathodic protection system may be applied simultaneously or in sequence.

In one embodiment of the invention, the system of the invention is used to provide corrosion protection for iron-based structures, more particularly, for steel structures. In some cases, the applied voltage and the frequency may be selected such that the iron potential and the pH are controlled in the passivation region of the Pourbaix diagram, thereby allowing formation of passive magnetite on the surface of the iron-based structure. For example, if the iron-based structure is immersed in water or buried in soil, the applied driving voltage may be selected in the range of 5V to 50V, and the operating frequency may be selected in the range of 100 Hz to 1 MHz.

In another specific embodiment of the invention, the system of the invention is used to provide corrosion protection for copper-based structures, more particularly, for copper alloy structures. In some cases, the applied voltage and the frequency are selected such that the copper potential and the pH may be controlled in the passivation region of the Pourbaix diagram, thereby allowing formation of passive adhering cuprous oxide on the surface of the copper-based structure. For example, if the copper-based structure is immersed in water or buried in soil, the applied driving voltage is selected in the range of 5V to 50V, and the operating frequency is selected in the range of 100 Hz to 1 MHz.

It should be noted that the passive magnetite or cuprous oxide may form in a wider pH range than what the Pourbaix diagram for elemental iron or copper suggests. In some implementations of particular iron-based alloys, the magnetite may form on the surface of the alloy structure at a lower pH level. Likewise, other passive metal oxides than the magnetite may form in a wider pH range or under a wider potential range than the passivation region of the Pourbaix diagram, provided that the metallic structure is subjected to the time varying electromagnetic wave treatment according to the invention to allow the formation of the passive metal oxides.

The system of the invention is applicable to the metallic structure, no matter whether it is placed in open loop or closed loop system.

Another aspect of the invention is to provide a method for providing corrosion protection of a metallic structure using time varying electromagnetic wave, comprising the steps of:

providing a generator for generating electromagnetic wave having a time varying frequency; and subjecting the metallic structure to the generated time varying frequency electromagnetic wave;

wherein a driving voltage applied to the generator to drive the generation of the electromagnetic wave and/or the frequency of the electromagnetic wave are selected such that the metallic structure is energized to form in-situ a passive oxidized species of the metal on a surface of the metallic structure, which species is insusceptible to corrosion.

Unlike the conventional cathodic protection systems or some methods which use the electromagnetic wave to treat the water for corrosion protection of the structure in a closed loop water system, the essence of the invention is to use the time varying pulsating electromagnetic wave to energize the structure itself, enabling formation in-situ of a passive oxidized species of the metal on the metallic structure, which species causes no corrosion. The passive oxidized species forms and acts as a protective coating on the structure surface, and this protective coating has advantages of self repairing and low maintenance and would last through the service life of the metallic structure as long as it is subjected to the treatment of the time varying pulsating electromagnetic wave. This on-site produced and active corrosion protective coating is not known nor suggested from the prior art.

The conventional cathodic protection system is dependent on the electrolyte conductivity. The lower the electrolyte conductivity, the higher the driving voltage is required. In contrast, the system of the invention is independent on the electrolyte conductivity, and the driving voltage to drive the formation of the passive oxidized species can be very small. For example, the driving voltage for the formation of the magnetite protective coating on the immersed or buried steel structure may be 5V to 50V, independently of the environment to which the structure is exposed.

To have a better understanding of the invention reference is made to the following detailed description of the invention and embodiments thereof in conjunction with the accompanying drawings.

DETAILED DESCRIPTION OF THE PREFERRED EMBODIMENTS

Figure 1:
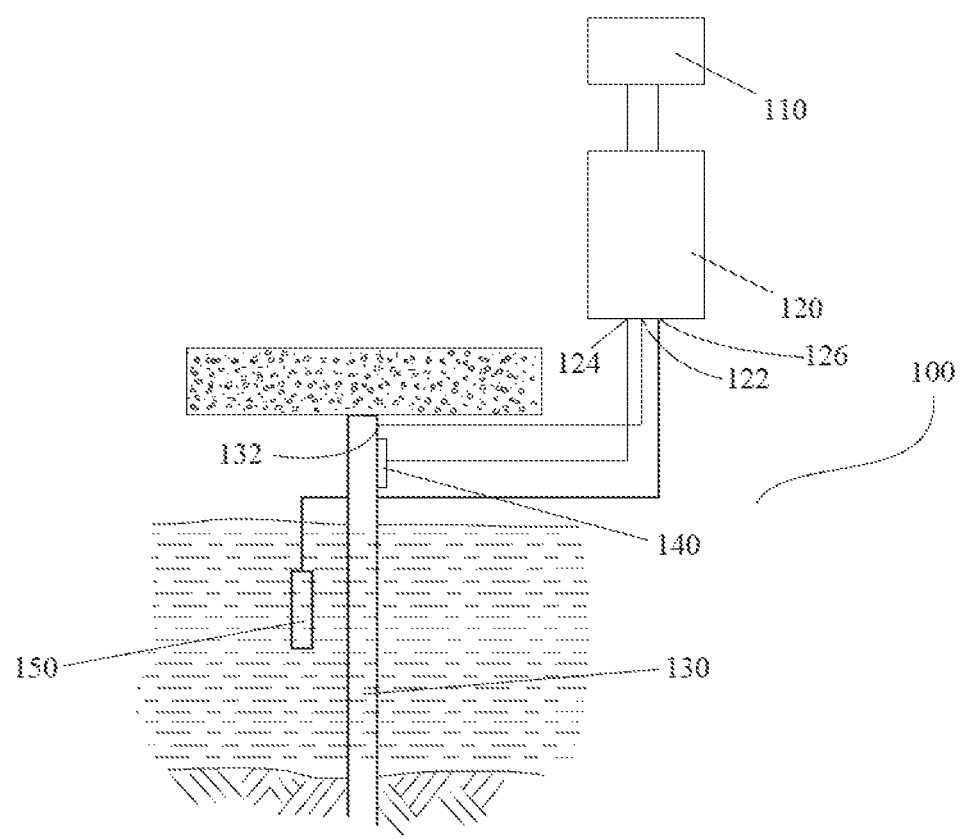
FIG. 1 is a schematic view of a system for providing corrosion protection of a metallic structure using time varying electromagnetic wave, which is constructed in accordance with a first embodiment of the invention.

While this invention is illustrated and described in preferred embodiments, the system for providing corrosion protection of a metallic structure using time varying electromagnetic wave may be produced in many different configurations, sizes, forms and materials.

The time varying pulsating electromagnetic wave has been known to be used extensively in a wide variety of industries. It is the inventor's finding that if a metallic structure is directly subjected to the time varying pulsating electromagnetic wave, a layer of passive oxidized species of the metal which depresses the oxidation process causing passivation will form in-situ on a surface of the metallic structure by properly controlling the potential of the metallic structure to fall into, for example, the passivation zone of the Pourbaix diagram for that metal or metal alloy. The invention is based on this finding.

The formation of the passive oxidized species of the metal by applying the electromagnetic wave to the metal structure is generally dependent on the applied wave frequency and the driving voltage, independent of the electrolyte conductivity. This passive oxidized species acts as a layer of protective active coating and serves to provide the corrosion protection throughout the service life of the structure as long as the electromagnetic wave treatment is in place. It has been found that, with such a coating forming on the steel surface, the general corrosion rate of the immersed steel structure can be reduced to less than 2 mpy (mil per year) in freshwater in a closed loop system without any cathodic protection.

Generally, the natural, unprotected and bare steel to seawater potential is typically in the range of −500 mV to −650 mV versus an Ag/AgCl reference electrode. For the well-coated steel, the potential is typically in the range of −600 mV to −700 mV. By the potential, the more negative the steel-to-water potential indicates lesser the corrosion current leaving the steel surface, i.e. the lesser the driving force for the corrosion reaction. In the conventional cathodic protection system, DC current energizes the steel, and the steel potential would become more negative gradually over time and correspondingly the corrosion current leaving the steel surface is reduced. Once it reaches −780 mV versus an Ag/AgCl reference electrode, the corrosion current on the steel surface is deemed to have completely halted and the driving force for the corrosion reaction is removed, causing no corrosion. This is called "full cathodic protection". It is within the ability of a person skilled in the art that the full cathodic protection potential may vary with the reference electrode used. The "full cathodic protection" used herein refers to the metallic structure which has a uniform potential where the corrosion reaction does not take place.

Such a cathodic protection principle is applicable when the time varying pulsating electromagnetic wave excitation is used according to the invention. The natural, unprotected and bare steel structure in seawater starts with a typical potential of −0.5 V to −0.65 V versus Ag/AgCl. When the electromagnetic wave is applied, the steel to seawater potential would gradually shift to the negative direction, suggesting the magnetite coating is progressively forming. Typically, the steel potential shifts to more negative than −750 mV within a few days of wave energization. At this −750 mV potential, the corrosion protection of the steel structure is better than a well coating. By further energizing the steel structure using the electromagnetic wave, the steel potential can go even more negative and ultimately reaches −780 mV. At that stage, the driving force for the corrosion reaction is removed, i.e. a "full cathodic protection" is attained.

The driving voltage for starting the formation of the magnetite coating may be very small, for example a few volts. In order to further save energy and shift the negative potential to an industrial full cathodic protection criteria of for instance −780 mV versus Ag/AgCl, the time varying pulsating electromagnetic wave excitation may be used in combination with a supplementary cathodic protection system. This combination permits further reduction in the driving voltage to for example 12 V or less and swift shift of the steel potential to −780 mV versus Ag/AgCl. Therefore, the combination would further reduce the total energy required to fully polarize the steel structure more negative and yet the magnetite coating can form swiftly over the steel surface. The magnetite is magnetic and adheres well to the steel structure surface.

Referring now to the drawings, FIG. 1 provides a system 100 constructed consistent with a first embodiment of the present invention. In this embodiment, the system 100 comprises a power supply unit 110; a generator 120 for generating electromagnetic wave having a time varying frequency; a steel pipe 130, a part of which is immersed in seawater; and an ultra low frequency (ULF) emitter 140 mounted on the pipe 130.

The power supply unit is electrically connected to the generator 120. AC power supply is used in the power supply unit 110. The power supply unit 110 supplies a desired AC driving voltage to the generator 120 enabling the generation of the time varying pulsating electromagnetic wave operating at a selected frequency. The power supply unit 110 preferably supplies to the generator 120 a driving voltage from a few volts to few hundreds volts, preferably 5V to 50V depending on the actual applications.

The generator 120 can be of any type of means known in the art that is able to generate the time varying frequency electromagnetic wave. For example, the generator may be a circuit board, a console card or a ferrite core antenna with a coil wound around the antenna. The generator 120 has two output terminals 122, 124, and the terminal 122 is in electrical connection with a first excitation site 132 positioned on the surface of the steel, and the terminal 124 is in electrical connection with the ULF emitter 140 mounted on a second excitation site of the steel pipe 130 in a spaced relation with the first excitation site 132. The second excitation site is selected so that the ULF emitter is preferably mounted above water, which may eliminate the need of a human diver which is otherwise necessary if the ULF emitter is mounted underwater instead. For the production of the magnetite on the surface of the steel pipe 130, the operating wave frequency is preferably in the range of 100 Hz to 1 MHz. The wave form of the time varying frequency electromagnetic wave can be square, triangular, sinusoidal or other forms.

In the conventional cathodic protection, the protective current enters the steel surface from the anode via the electrolyte to the cathode steel surface and shifts the steel potential to more negative potential for the full cathodic protection. In contrast, the wave current of the present invention does not travel in the water, instead it goes from the generator 120 to the ULF emitter 140 and then enters the steel directly above water and underwater. With the operating frequency in the range of 100 Hz to 1 MHz, the electromagnetic wave would be traveling along the full steel pipe and allows the formation of the magnetite coating along the full steel surface.

Figure 3:
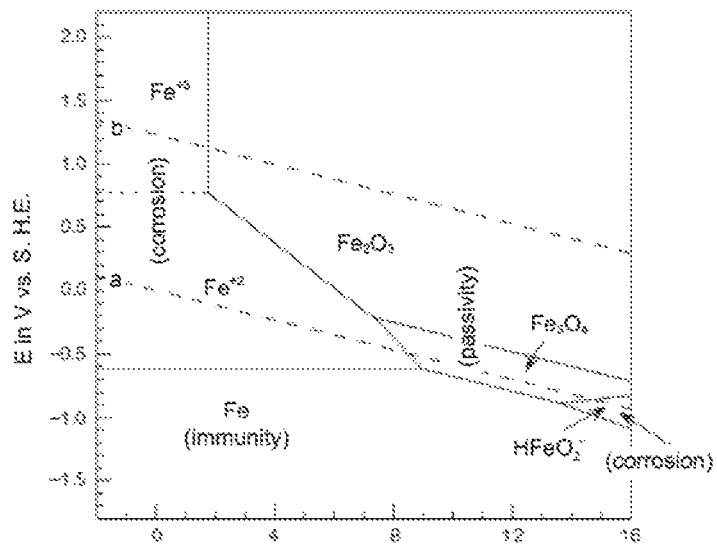
FIG. 3 is the Pourbaix Diagram for iron at 25° C.

Under the conditions of this frequency range and the driving voltage described above, the steel would be controlled to be in the equilibrium state at a desired potential in the seawater, so as to fall into the passivation region of the relevant Pourbaix diagram. In this passivation region, the magnetite ($Fe_3O_4$) would be able to form gradually on the steel surface (see FIG. 3). Continuous application of the electromagnetic wave permits the potential of the steel pipe surface to be polarized to shift towards the negative direction. It has been found that the steel pipe potential can reach readily to −750 mV versus Ag/AgCl with the onset of magnetite formation. At that stage, the corrosion rate of the steel pipe 140 is already minimal. However, the time taken to shift the potential from −750 mV to −780 mV versus Ag/AgCl which is the conventional criteria for the full cathodic protection of iron would take a longer period of time.

In order to comply with the full cathodic protection criteria in a short period of time if the need arises, a supplementary cathodic protection system may be added. The supplementary cathodic protection system may be a sacrificial anode cathodic protection system or an impressed current type cathodic protection system or a mixture of the two systems. In the embodiment shown in FIG. 1, the supplementary cathodic protection system is the impressed current type, which comprises an S-emitter 150 acting as an anode and immersed in the seawater. The S-emitter 150 is connected to a terminal 126 of the generator 120, which is a DC power source. To provide the DC power source, the internal circuit of the generator comprises a cathodic protection rectifier for converting the AC power supply to a DC output. Other anodes are possible for the supplementary cathodic protection system, and may be selected in a variety of shapes and sizes, which would be with the ability of a person skilled in the art.

In the supplementary cathodic protection system shown in FIG. 1, the DC current will travels through the S-emitter 150 to the steel pipe 130 to effect the cathodic protection. Due to the use of the electromagnetic wave treatment of the invention, the supplementary cathodic protection system requires only a fraction of the usual cathodic protection scheme current density. After both the main electromagnetic wave system and the supplementary cathodic protection system are switched on simultaneously or in sequence, the steel pipe 130 will have a full cathodic protection potential in a much shorter period of time with very low energy consumed compared with the conventional cathodic protection system. Once the steel potential reaches the full cathodic protection level, the supplementary cathodic protection system may be switched off, leaving the main electromagnetic wave system in operation alone. It is sufficient to hold the steel potential at the full protection level.

The ULF emitter 140 is provided to optimize and reinforce the electromagnetic wave generated by the generator 120, in order to facilitate the formation of the magnetite coating along the full steel surface. The ULF emitter 140 is well known in the art and will not be described in more details.

The magnetite acts as a good protective coating and has the advantages of self repairing and low maintenance. The self repairing property of the magnetite layer is unique. When the magnetite coating is damaged during service, a new magnetite layer will re-form on the freshly exposed bare steel surface. As a result, the maintenance of the steel structure is low. The magnetite layer has similar properties as magnetite anodes. The magnetite layer formed on the steel surface is conductive and when electrical current leaves the magnetite layer surface, the magnetite layer is practically not consumed similar to magnetite anodes. This means that even if there is interference corrosion current leaving the magnetite coated steel structure surface, the steel pipe interference corrosion problem is mitigated.

Another feature of the electromagnetic wave system of the invention is that the wave has the tendency to travel on the steel surface throughout the entire cross section of the steel via the skin effect. Under this skin effect, the magnetite layer not only forms on the steel's general outer surfaces, but also forms within the steel's pits, cracks and crevices not reachable by cathodic protection current. This makes it an excellent corrosion protection method for applications where conventional DC cathodic protection current and conventional coating materials cannot normally reach.

It would be noted that, with the electromagnetic wave excitation at a given sufficient driving voltage, an unusual avalanche current effect is likely to take place, which cannot be found in conventional DC or fixed frequency AC current circuit where current traveling within a conductor or a metal will follow Ohm's law and is tied to the material's electrical resistivity and also would not change over time. In the case of the electromagnetic wave excitation, when the driving voltage reaches a certain threshold voltage, the current will no longer follow the Ohm's law. It is believed that the electrons within the metal will undergo an avalanche crashing effect similar to that in a semi-conductor with the current increasing exponentially as it travels away from the wave generator. Theoretically, such distance could reach infinity but the increasing current will blow the fuses of the wave generator. As such, a current control regulator is needed to control the avalanche current. But with this current control regulator, the distance at which the electromagnetic wave could reach will hence be limited.

Alternatively, the driving voltage will be controlled to a level close to but below the avalanche effect threshold voltage such that the avalanche current will not take place while the driving voltage is just sufficient to promote the formation of the magnetite.

Figure 2:
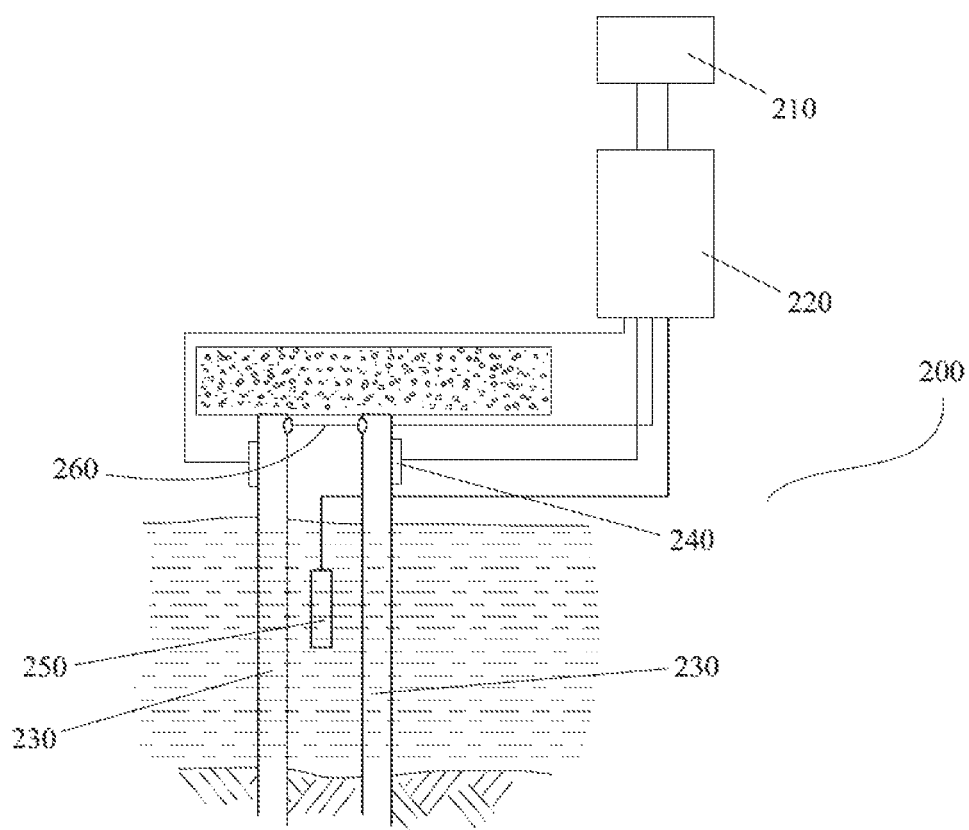
FIG. 2 is a schematic view of a system for providing corrosion protection of a metallic structure using time varying electromagnetic wave, which is constructed in accordance with a second embodiment of the invention.

Now referring to FIG. 2, there is illustrated a system 200 constructed consistent with a second embodiment of the present invention. As illustrated, the system 200 is used to simultaneously excite the formation of the magnetite layer on two steel pipes immersed in seawater and the arrangement of the system 200 is similar structurally to the system 100 discussed above. In particular, the system 200 comprises a power supply unit 210; a generator 220 electrically connected to the power supply unit 210 for generating electromagnetic wave having a time varying frequency; two steel pipes 230, both of which have a part immersed in seawater; and two ultra low frequency (ULF) emitters 240 mounted on each of the pipes 230 above water and in electrical connection with respective output terminals of the same generator 220. The two pipes 230 would be energized by the electromagnetic wave to form the magnetite coating. The system 200 further comprises a supplementary cathodic protection system comprising a S-emitter 250 arranged underwater and between the two steel pipes 230.

The description of the power supply unit 210, the generator 220, the ULF emitters 240 and the supplementary cathodic protection system may be made reference to the corresponding units discussed above in the first embodiments and will be omitted here.

FIG. 2 shows that an electrical conductor 260 such as rebar or wire is used to connect electrically the two pipes, allowing them to receive evenly distributed corrosion protection from the main electromagnetic wave excitation system and the supplementary cathodic protection system.

With a closed loop water system, some of the energy used for energizing the two steel pipes 230 would be dissipated into the water and thus excite the water too. Consequently, the energy required to protect the steel pipes in the closed loop water system is even lesser than the open loop water system. This is particularly useful to protect the steel members in a closed loop cooling water or chilled water system.

Figure 4:
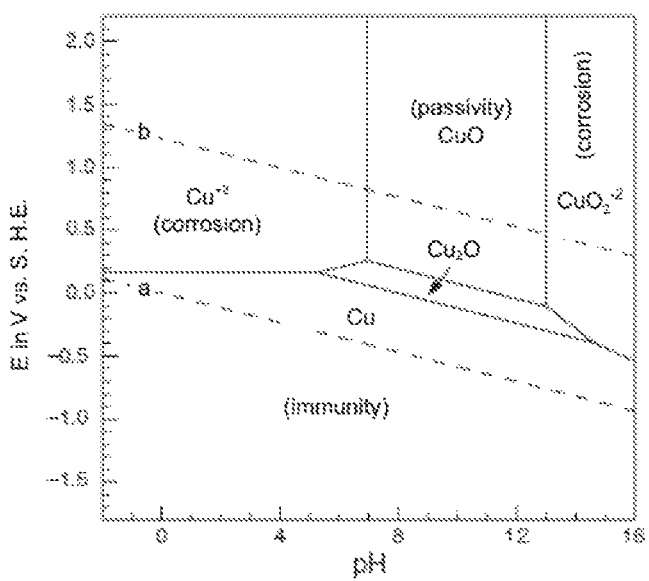
FIG. 4 is the Pourbaix Diagram for copper at 25° C.

The system and method of the invention are applicable to other metallic structures than iron-based structures. For example, when a copper alloy structure is subjected to the time varying pulsating electromagnetic wave, a protective coating of passive cuprous oxide ($Cu_2O$) would form on and well adheres to a surface of the structure by properly controlling the driving voltage of the electromagnetic wave to operate in the range of 5V to 50V and controlling the frequency in the range of 100 Hz to 1 MHz such that the copper alloy potential is, for example, controlled in the passivation region of the relevant Pourbaix diagram (see FIG. 4). Likewise, this passive oxidized species is a very effective corrosion protection coating to prevent the copper alloy structure from corrosion.

According to the invention, the system and method for corrosion protection using time varying pulsating electromagnetic wave can find a wide range of applications, including but not limited to all submerged or buried steel structures of jetties, wharf, steel retaining walls, anchor piles, oil platforms, oil rigs, well heads, tank internal, tank external, wind mill foundation piles, bridge foundation piles, buoys, onshore and offshore steel or metallic pipe internal and external surface, concrete weight coating pipeline, cooling water steel pipe internals, cooling water intake structures, screens, gates, stop logs, steel in concrete.

The invention thus provides a system and a method for providing corrosion protection of a metallic structure using time varying electromagnetic wave which is very simple and energy-saving and which provides an efficient corrosion protection for the metallic structure. In this invention, it is the metallic structure itself that is energized by the time varying electromagnetic wave to form in-situ a passive oxidized species of the metal on the metallic structure surface. After this passive oxidized species forms, no corrosion occurs. This is the most distinguishing and unique feature of the invention from the prior art technologies.

Because of the use of the electromagnetic wave to energize the metallic structure, the supplementary cathodic protection current required is reduced significantly, the driving voltage needed to deliver the cathodic protection current is therefore very low. In addition, the supplementary cathodic protection system can be switched off after the metallic structure reaches the full cathodic protection potential, leaving the main electromagnetic wave in operation alone, this further saves energy costs.

While the embodiments described herein are intended as exemplary corrosion protection system and method, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A system for providing corrosion protection of a metallic structure using time varying electromagnetic wave, comprising:
    a generator for generating an electromagnetic wave having a time varying frequency, said generator having at least two output terminals in electrical connection respectively with first and second excitation sites which are positioned in a spaced manner on the metallic structure, allowing for subjecting the metallic structure to the electromagnetic wave;
    an ultra low frequency emitter for reinforcing the electromagnetic wave, the ultra low frequency emitter being mounted on the second excitation site and electrically coupled to one of the at least two output terminals; and
    an electric power source connected to the generator for applying a driving voltage to the generator to drive the generation of the electromagnetic wave;
    wherein the driving voltage and/or the frequency of the electromagnetic wave are selected such that the metallic structure is energized through the first and second excitation sites to form in-situ a passive oxidized species of the metal on a surface of the metallic structure; and
    a protective coating comprising the passive oxidized species of the metal of the metallic structure is formed in-situ on the surface of the metallic structure, wherein the protective coating is insusceptible to corrosion and is self-repairing.

2. The system as claimed in claim 1, further comprising a supplementary cathodic protection system applied to the metallic structure.

3. The system as claimed in claim 2, wherein the supplementary cathodic protection system comprises a sacrificial anode cathodic protection system or an impressed current type cathodic protection system or a combination of the two systems.

4. The system as claimed in claim 1, wherein the metallic structure is iron-based or copper-based, and the applied voltage and the frequency are selected for allowing formation of passive magnetite on the surface of the iron-based structure or allowing formation of passive cuprous oxide on the surface of the copper-based structure.

5. The system as claimed in claim 4, wherein the iron-based structure or the copper-based structure is immersed in water or buried in soil, and the driving voltage is applied in the range of 5V to 50V, and the frequency is operating in the range of 100 Hz to 1 MHz.

6. The system as claimed in claim 5, further comprising a supplementary cathodic protection system applied to the iron-based structure or the copper-based structure.

7. The system as claimed in claim 4, further comprising a supplementary cathodic protection system applied to the iron-based structure.

8. A method for providing corrosion protection of a metallic structure using time varying electromagnetic wave, comprising:
    providing a generator for generating an electromagnetic wave having a time varying frequency, said generator having at least two output terminals;
    positioning the at least two output terminals in a spaced manner in electrical connection respectively with first and second excitation sites on the metallic structure;
    mounting an ultra low frequency emitter for reinforcing the electromagnetic wave on the second excitation site electrically coupled to one of the at least two output terminals; and
    subjecting the metallic structure to the generated time varying frequency electromagnetic wave;
    wherein a driving voltage applied to the generator from an electric power source to drive the generation of the electromagnetic wave and/or the frequency of the electromagnetic wave are selected such that the metallic structure is energized through the first and second excitation sites to form in-situ a passive oxidized species of the metal on a surface of the metallic structure; and forming in-situ a protective coating comprising the passive oxidized species of the metal of the metallic structure formed on the surface of the metallic structure, wherein the protective coating is insusceptible to corrosion and is self-repairing.

9. The method as claimed in claim 8, further comprising applying a supplementary cathodic protection system to the metallic structure.

10. The method as claimed in claim 9, wherein the supplementary cathodic protection system comprises a sacrificial anode cathodic protection system or an impressed current type cathodic protection system or a combination of the two systems.

11. The method as claimed in claim 9, further comprising switching off the supplementary cathodic protection system after the metallic structure reaches a full cathodic protection potential.

12. The method as claimed in claim 8 wherein the metallic structure is iron-based or copper-based, and the applied voltage and the frequency are selected for allowing formation of passive magnetite on the surface of the iron-based structure or allowing formation of passive cuprous oxide on the surface of the copper-based structure.

13. The method as claimed in claim 12, wherein the iron-based structure or the copper-based structure is immersed in water or buried in soil, and the driving voltage is applied in the range of 5V to 50V, and the frequency is operating in the range of 100 Hz to 1 MHz.

14. The method as claimed in claim 12, further comprising applying a supplementary cathodic protection system to the iron-based structure or the copper-based structure.

* * * * *